United States Patent [19]

Carrol

[11] Patent Number: 4,680,112
[45] Date of Patent: Jul. 14, 1987

[54] APPARATUS FOR THE LIQUID TREATMENT OF SOLIDS

[75] Inventor: Alan Carrol, London, United Kingdom

[73] Assignee: Trenchbond Limited, United Kingdom

[21] Appl. No.: 685,146

[22] Filed: Dec. 21, 1984

[30] Foreign Application Priority Data

Dec. 23, 1983 [GB] United Kingdom ............... 8334304

[51] Int. Cl.⁴ ............................................. B01D 35/18
[52] U.S. Cl. ................................... 210/179; 210/197; 210/413; 210/455; 210/512.3; 209/238
[58] Field of Search ............. 210/770, 742, 787, 178, 210/179, 197, 413, 416.1, 455, 512.1, 512.3, 541, 542, 219; 209/235, 237, 238; 137/808, 811; 68/147, 175; 162/384

[56] References Cited

U.S. PATENT DOCUMENTS

| | | | |
|---|---|---|---|
| 1,311,831 | 7/1919 | Morse | 210/179 |
| 2,075,070 | 3/1937 | Upton | 210/179 |
| 3,207,627 | 9/1965 | Dietzel et al. | 210/742 |
| 3,688,906 | 9/1972 | Ferrara | 210/179 |
| 4,170,551 | 10/1979 | Honour | 210/179 |
| 4,264,740 | 4/1981 | Christ et al. | 210/179 |
| 4,499,614 | 2/1985 | Yeagley | 210/179 |
| 4,515,684 | 5/1985 | Brown | 210/178 |
| 4,565,638 | 1/1986 | Zucker | 210/179 |

FOREIGN PATENT DOCUMENTS

| | | |
|---|---|---|
| 2926557 | 1/1981 | Fed. Rep. of Germany . |
| 515640 | 5/1921 | France . |
| 591405 | 7/1925 | France . |
| 635285 | 3/1928 | France . |
| 1429838 | 3/1976 | United Kingdom . |

Primary Examiner—Richard V. Fisher
Assistant Examiner—Wanda L. Millard
Attorney, Agent, or Firm—Bacon & Thomas

[57] ABSTRACT

An apparatus for treating solids with a liquid at elevated or ambient temperatures comprises an assembly of vertical Pot (1) sealed by Lid (3) in which Pot (1) contains the liquid and horizontal low level stirring means (6) inducing a liquid vortex and contains disposed above stirring means (6) horizontal spokes (9) offering minimum interference with the vortex and contains vertical open cylinder (11) bottomed by central apertured layer (10), being liquid permeable but supporting solids impermeably. The vortex rises through spokes (9) up internal vertical wall of Pot (1) and into diagonally opposite inlets (18) of horizontal tube (16) suspended internally from lid (3) above cylinder (11). Liquid downpours through exit (19) of tube (16) through solids in cylinder (11) and through layer (10) to re-enter the vortex. Layer (10) is predisposed above the unstirred level of the thermostated liquid, hence at the cease of stirring, the total liquid fall back leaves the solids isolated from the liquid at the thermostated temperature of the assembly.

12 Claims, 9 Drawing Figures

APPARATUS FOR THE LIQUID TREATMENT OF SOLIDS

This invention relates to an apparatus wherein a solid substance is treated with liquid solvent at pre-selected ambient or elevated temperatures and pressures, and wherein subsequent to such treatment the resultant solid substance is isolated from the resultant liquid at those temperatures and pressures.

It is an object of this invention to provide an apparatus for the separation of mixtures of solid chemical substance into their constituent components, or for the purification of impure chemical substances by removal of relatively small quantities of constituents present as impurities in such impure substances.

It is a further object of this invention that its use shall extend to the employment of higher temperatures and simpler solvents than is possible with presently known apparatuses which depend upon extraction of solids by solvents refluxing at their atmospheric boiling points, and that its use shall advantageously extend to a range of temperatures for any given solvent rather than just the single atmospheric reflux temperature of that solvent.

Further it is an object of this invention to provide an apparatus wherein the isolated resultant liquid at a given preselected temperature can be subject in situ to external programmed or controlled cooling of the apparatus, whereby the crystalization of any solutes in the resultant liquid can be more closely controlled as to crystal size and purity than is possible with presently known apparatus open to the atmosphere.

Thus in accordance with the invention an apparatus is provided comprising a vertically cylindrical Pot and Lid threadingly engageable therewith, whereby the Pot can be pneumatically sealed. The Lid bears a thermometer sensor and a temperature control sensor which monitors, directly or remotely the function of heating means jacketing the Pot. Within the Pot and situated to rotate in a horizontal plane near the Pot bottom is a rotor driven mechanically or magnetically by external means under the Pot or supporting the Pot in the case of laboratory use when the external means are well known as a magnetic mixer, or a magnetic stirrer.

Within the pot and resting freely on the bottom thereof is an annulus of external diameter substantially equal to the internal pot diameter, the upper region of which annulus directly bears horizontally disposed spokes supporting a flanged ring concentrically within the said annulus. (Those spokes are hereafter called "the spokes"). The said flanged ring bears and bounds an apertured layer (hereafter called the "central"). The flanged ring also bears an open cylinder vertically coaxial with the pot. The central is generally permeable by the liquid solvent but impermeably supports the solid substance, and the central forms a horizontal bottom to the said cylinder, the upper rim of which cylinder lies in a middle horizontal region of the pot when closed by the lid, the open cylinder containing the said solid substance.

The integral assembly comprising the annulus, the spokes, the flanged ring, the central and the cylinder is called hereafter "the separator."

In a preferred embodiment of this invention the bottom rim of the separator annulus optionally rests freely on the upper rim of a further annulus or of a vertical set of annuli each of external diameter substantially equal to the internal diameter of the pot (hereafter called the spacer or spacers). By use of the spacers, the vertical clearance between the pot bottom and the central can be optionally increased.

An open ended tube (hereafter called "the cascader") is centrally rigidly suspended by a vertical stem engaged by left handed thread in a central bore in the internal planar face of the lid so that when the pot is sealed by the lid, the cascader is horizontally disposed above the separator cylinder and below the pot rim. The cascader is of overall length substantially equal to the internal diameter of the pot, and the vertical ends of the cascader are convexly profiled to match the concavity of the internal vertical pot wall. The said cascader overall length is such as to leave equal small clearances between the said convex cascader ends and the said internal vertical pot wall. As drawn hereafter the cascader has diagonally opposite vertically planar slant openings which intersect the ends of the cascader so that the vertical open end depth of each such opening is equal to the internal diameter of the cascader, and in a preferred embodiment of this invention the slant openings are parallel to each other and are hereafter called "the inlets" and also there is a centrally disposed opening (hereafter called "the exit") in the bottom cylindrical face of the cascader. The inlet areas are in sum generally equal to the exit area.

In order that the invention and its working effect shall be better understood, reference will hereafter be made by way of example to the accompanying drawings, in which FIG. 1 is a flow diagram in diametrically vertical section through the working closed apparatus, under full rotational stirring;

Figure 6:
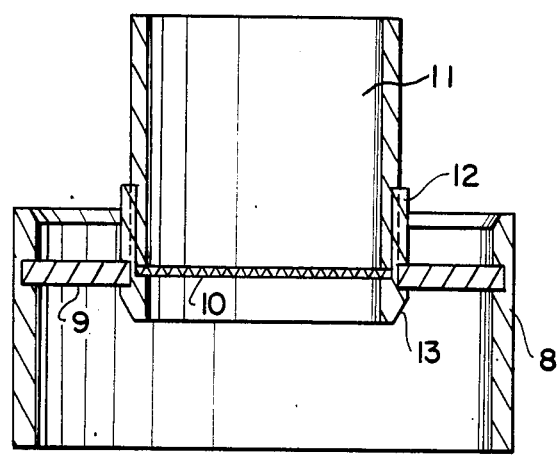
Figure 8:
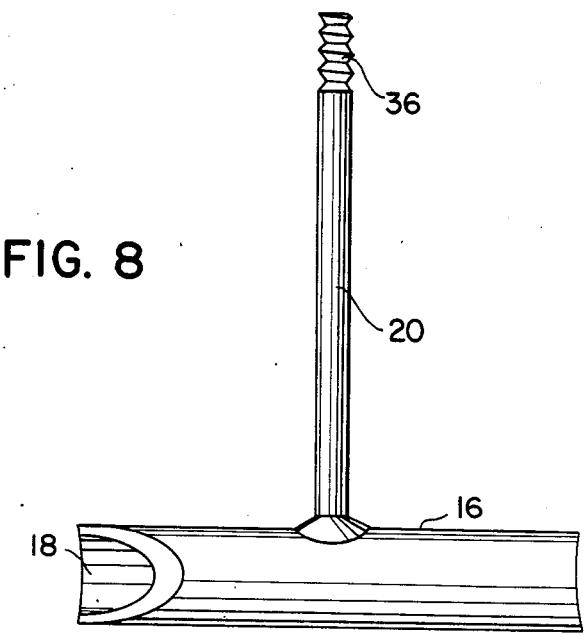
Figure 9:
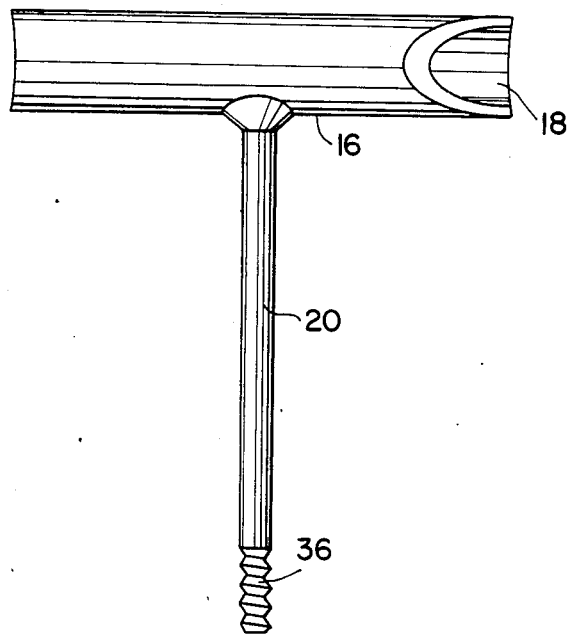
Figure 1:
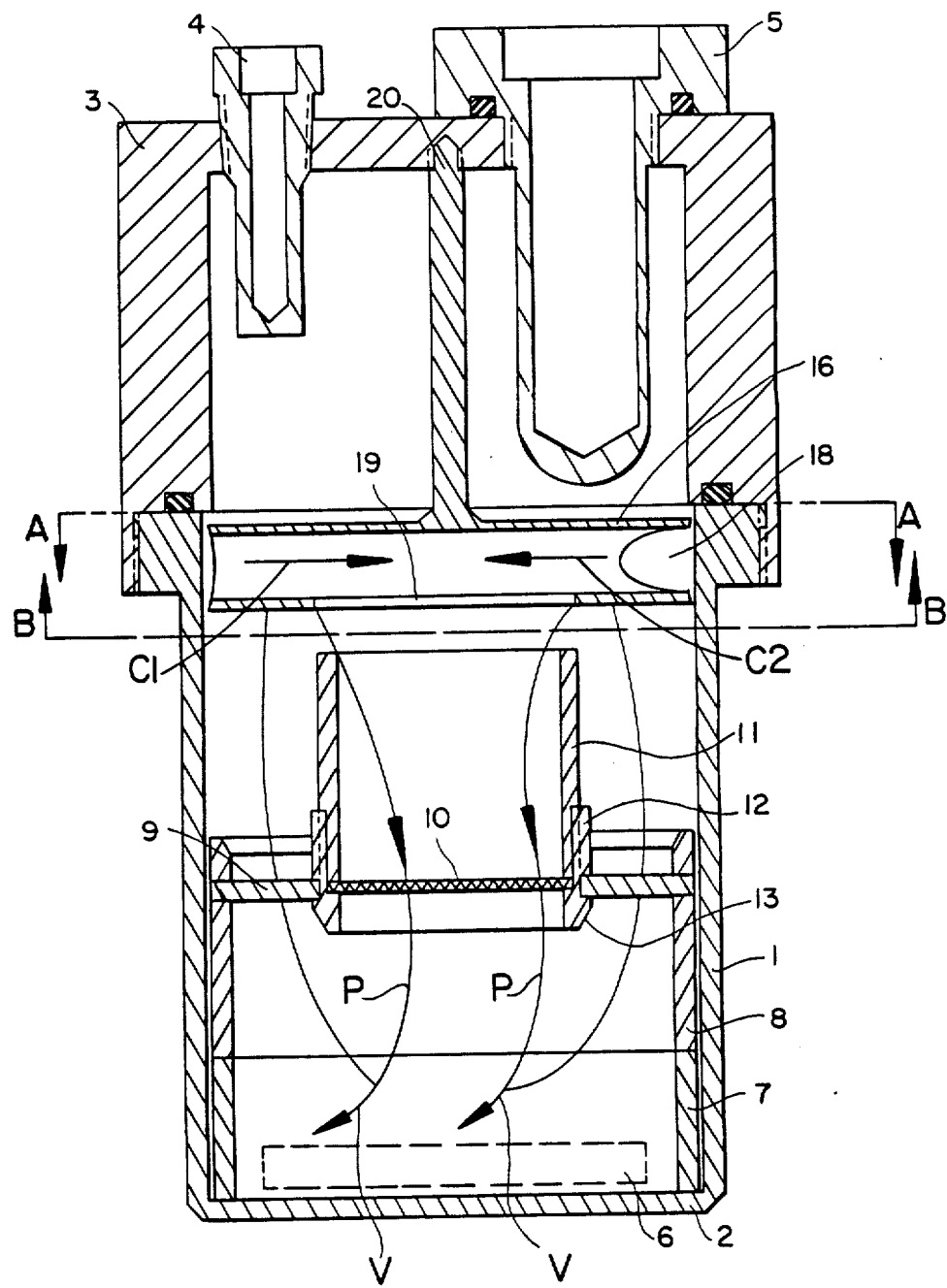

FIG. 6 is the separator assembly in diametrically vertical section. FIG. 7 is an elevation showing the sealed apparatus, the temperature responsive controlling means and the heating means. FIG. 8 is the cascader in elevation showing one of the slant inlets and the vertical stem left hand threaded and FIG. 9 is the inverted cascader in elevation showing the opposite slant inlet hereinbefore mentioned and hidden from view in FIG. 8.

Figure 1:
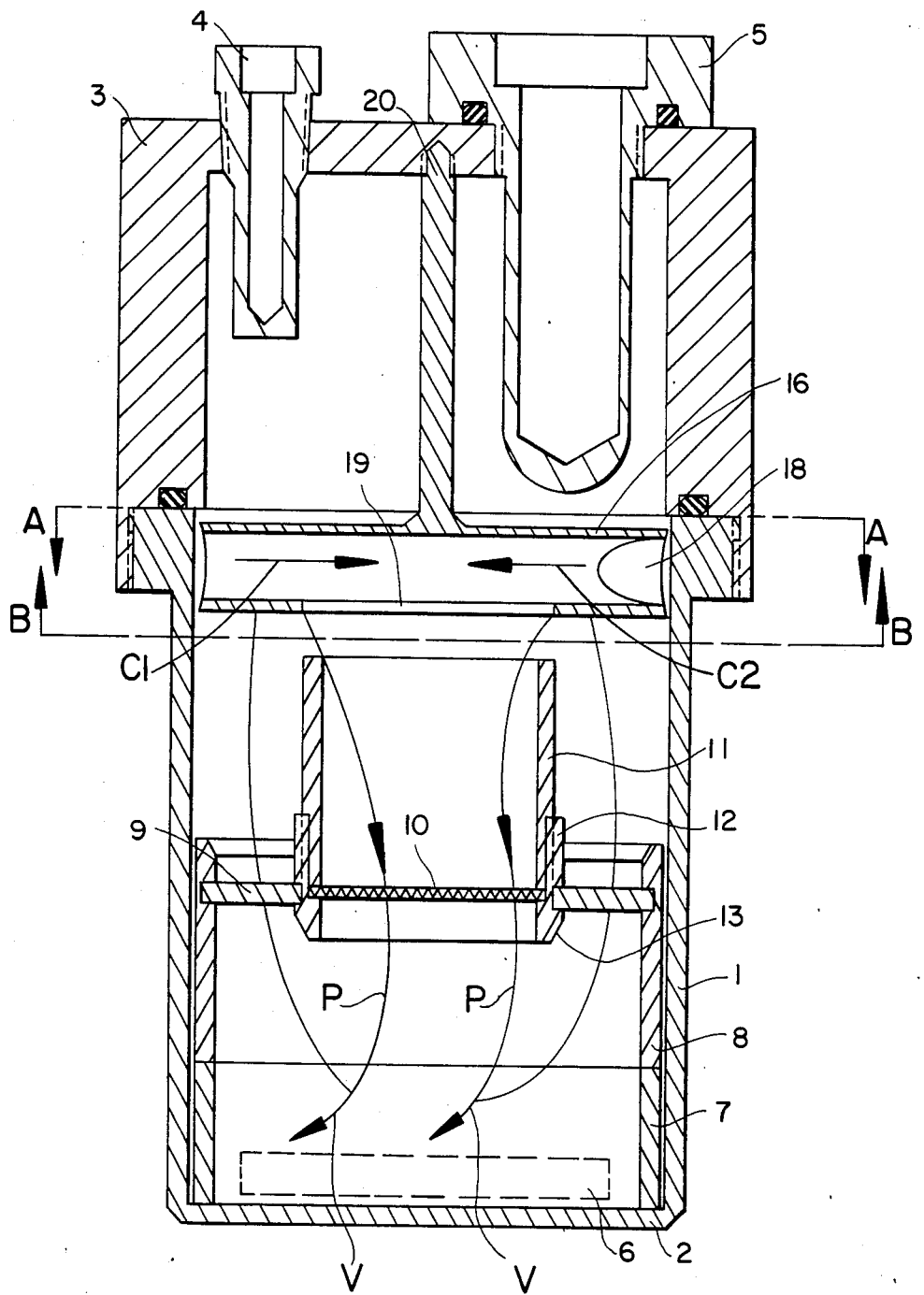

Referring to the Drawings, FIG. 1 illustrates the apparatus, which comprises; Pot 1 with bottom 2 sealed by lid 3, which lid shows a thermometer thermowell 4 and a temperature control thermowell 5.

In a particular embodiment of this invention, magnetic rotor 6 is shown dotted and is in Rotatory contact with bottom 2 in phase with the magnetic mixer, but generally rotor 6 rotates under the separator assembly in FIG. 6, the bottom rim of which assembly rests freely either on pot bottom 2 or upon spacer 7, which spacer slip fits the Pot 1 as does annulus 8 of separator assembly in FIG. 6.

The Separator shown in FIG. 6 is an integral assembly comprising annulus 8, spokes 9, central 10, and cylinder 11, the mounting for cylinder 11 being a flanged ring 12. In FIG. 7, pot 1 sealed by lid 3 is jacketed by heating means 21, from which cut away 22 shows pot 1. Temperature responsive means 23 in association with thermowell 5 controls heating means 21.

In FIGS. 8 and 9 are shown slant inlets 18 to cascader 16 and the left hand thread 36 in vertical stem 20.

Figure 3:
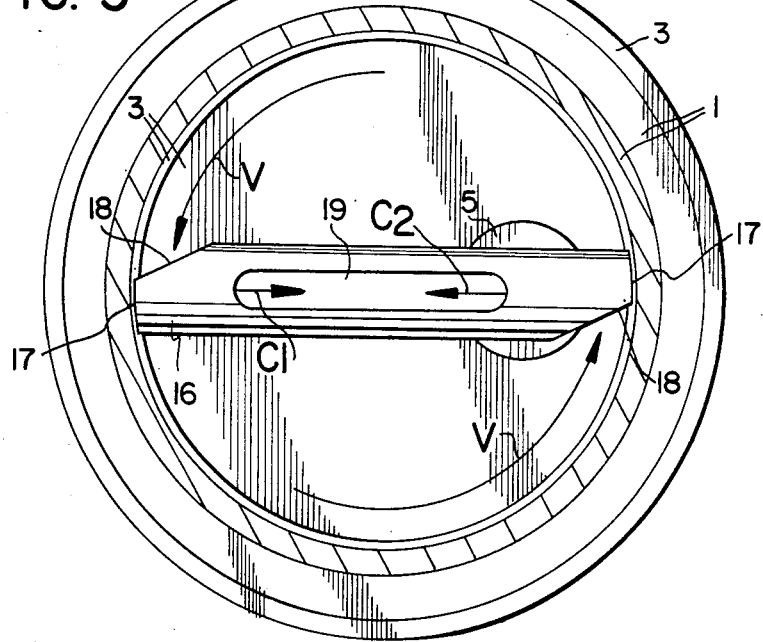
FIG. 3 is a horizontal section of the apparatus along line BB upwards.
Figure 4:
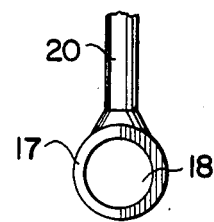
FIG. 4 is an end on view of the cascader and FIG. 5 is a side elevation of the cascader.
Figure 5:
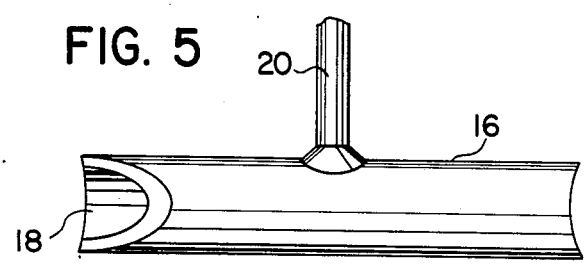

Cascader 16 has convex vertical ends 17 and inlets 18 and FIGS. 1 and 3 show exit 19 centrally and longitudinally disposed in the bottom cylindrical face of cascader 16. Vertical stem 20 is left hand threadingly engaged in lid 3 which thread procures that cascader 16 shall not be unscrewed under the current induced by rotor 6. The laboratory operation of the apparatus of the hereinbefore described invention with respect to the Drawings is as follows;

A magnetic mixer supports the heating means surrounding pot 1 which pot contains the liquid at room temperature filled up to an engraved level therein, rotor 6, spacer 7 and separator assembly as in FIG. 6, spacer 7 procuring that the plane of central 10 of the separator shall lie above the level of the unstirred liquid even at the preselected working temperature. The solid to be separated into its components or purified is placed in cylinder 11. Lid 3 bearing cascader 16 and sensors in their thermowells 4 and 5 is screwed down to seal pot 1, and the rotational stirring and heating means are switched on. The sensor is thermowell 5 in association with the monitoring means and the heating means hereinbefore described procures equilibrium about the preselected working temperature within the sealed pot.

Figure 2:
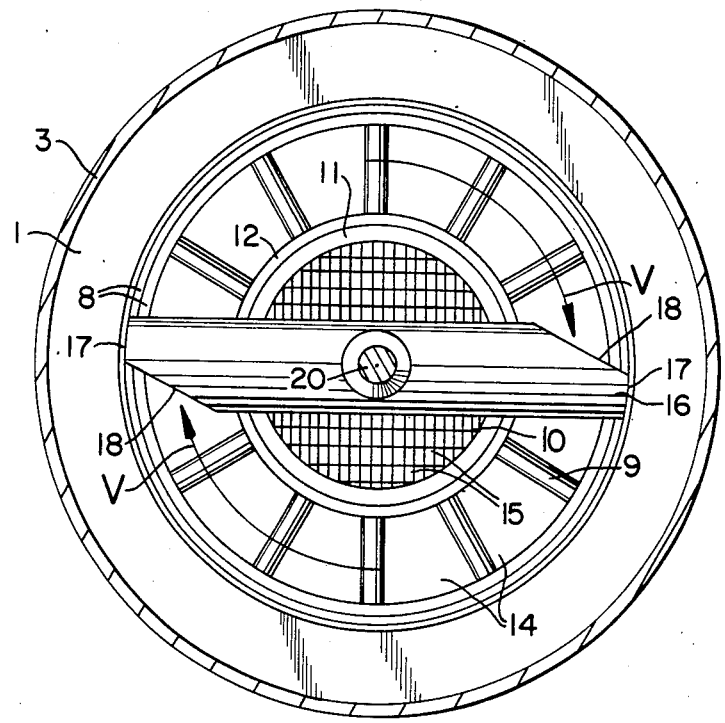
FIG. 2 is a horizontal section of the apparatus along line AA downwards.

Rotor 6 rotating at its maximum rate induces a strong vortex effect in the liquid, the greater part of which rises through the spokes 9 in the usual clockwise horizontal rotatory direction shown in FIG. 2.

Hence the resultant vortex climbs up and upon the internal pot wall and thence enters diagonally opposite inlets 18 of cascader 16 simultaneously, setting up opposing currents C1 and C2 within cascader 16 as shown in FIG. 1 and in FIG. 3. Currents C1 and C2 unite centrally in cascader 16 and downpour through exit 19 thereof in a general direction shown as P in FIG. 1.

That downpour enters cylinder 11 of the separator and completely treats the solid contained therein passing through central 10 and re-enters the vortex current V as induced by rotor 6 and as shown in FIGS. 1, 2 and 3.

Subsequently, the rotational stirring is retarded or switched off, when the entire liquid content of the apparatus at the preselected working temperature falls back below central 10, since the necessary vertical clearance between pot bottom 2 and central 10 for such fall back is attained by spacer 7.

It will be understood that for a given solvent and at a particular preset temperature the solvent density is available and hence for this apparatus a static solvent level is pre-calculable for that temperature. Hence a minimum vertical clearance as referred to is predictable.

The heating means are then switched off and the apparatus is subjected to the desired controlled or programmed cooling as previously described. Central 10 continues to support the resultant solid, isolated from the resultant liquid.

Manufacture of apparatus previously described

The material is a commercial stainless steel well known as 316 s.s. containing at least 10% nickel and at most 0.08% carbon.

The formation of thick walled blanks for pot 1 and lid 3 by electron beam welding of disc to tube is feasible for subsequent profiling in a vertical boring jig.

Nevertheless, pot 1 and lid 3 are at present cost advantageously turned out of solid round section billets on the computerized lathe as a single stage process. Lid 3 and pot 1 off the lathe bear their respective undercut internal and external closure threads, currently B.S.F., 20 T.P.I. Also lid 3 bears its pressure seal housing groove.

The lid bores, currently International Metric Fine thread M20 for thermowell 5 and ⅛ N.P.T. for thermowell 4 are tapped and threaded on a Universal Mill dividing head, as is the internal 6BA left hand threaded central bore inside lid 3 for Stem 20.

For the separator, FIG. 6, flanged ring 12 is rebated, and internally undercut threaded, current 2BA, 31 T.P.I., on a vertical boring jig.

Also flanged ring 12 is radially tapped for the pins of layer 9 on that jig dividing head. Similarly, annulus 8 is top rim chamfered and side tapped for the other ends of those pins 9. Assembly is by pin insertion through annulus 8 into the radial side bores in flanged ring 12 and by argon spot welding into external cylindrical face of annulus 8.

On the lathe; annulus 8 is turned back to its specified outside diameter, flanged ring 12 is tapered to profile 13 in FIG. 6, and bottom cylinder 11 is externally threaded, currently 2BA, 31 T.P.I.

Layer 10 is a preformed disc out of stainless steel fine mesh or out of compressed glass fibre.

From tube of specified inside and outside diameters cascader 16 is formed on the Universal Mill by direct milling of convex vertical ends 17 and then slant cutting of inlets 18.

By end milling, tube 16 is centrally bored through to take a slot cutter, and cascader 16 off the mill has exit slot 19 diametrically opposite a bore for taking bottom stem 20 in press fit. Top end stem 20 is threaded by 6BA left hand die. Assembly of finished cascader 16 is by argon ring weld of bottom stem 20 after pressing into the bore referred to.

I claim:

1. A separator apparatus for the separation at ambient or elevated temperatures and pressures of a mixture of solid substances by treatment with a solvent, in which mixture one or more of the components thereof is substantially insoluble under the selected operating conditions, the apparatus comprising:
   a pot having a bottom wall and generally cylindrical sidewall extending upwardly from the bottom wall, the top of the sidewall defining a mouth;
   a lid for closure and pneumatic sealing of said mouth when the apparatus is in use;
   horizontally rotational stirring means arranged in the pot in contact with or in proximity to said bottom wall;
   heating means; and
   temperature responsive means for controlling the heating means;
   wherein the pot contains a separator assembly comprising a generally central receptable for holding said solid mixture, the receptacle including a bottom wall permeable to said solvent but impermeable to said solid mixture and a sidewall extending upwardly from the bottom wall, the separator assembly further comprising one or more spokes extending outwardly from said receptacle for upward passage therethrough of a vortex of the solvent; wherein there are support means compatible with said vortex for supporting the spokes at the outer end regions thereof and arranged so as to support the separator assembly with the base of the receptacle and the spokes spaced above the bottom wall of the pot to define between the bottom wall of the pot and the base of the receptacle and the spokes a space for holding the solvent and the said stirring means in the said solvent; wherein in use the stirring means induces a solvent vortex which runs up to above the top of the separator assembly; and wherein a duct is disposed transversely above the separator assembly so that the duct will not be moved in use by the force of the said vortex thereon, which duct has a length such as to define a small clearance between the ends thereof and the internal sidewall of the pot and has defined at its ends inlets for the solvent vortex, an outlet being defined in the bottom of the duct above the receptacle for the solvent to pour down onto the mixture therein.

2. An apparatus as claimed in claim 1, in which the duct is a tube of annular cross sectional shape and in which the ends thereof are convexly profiled to match the concavity of the internal vertical wall of the said pot and in which the small clearance is defined between the said convex end profile and the said matching concavity of the pot wall.

3. An apparatus as claimed in claim 2, in which the inlets of the tube are defined by diagonally opposite vertically planar slant openings which intersect the ends of the said tube so that the vertical open end depth of each such opening is equal to the internal diameter of the tube.

4. An apparatus as claimed in claim 3, in which the said slant openings are parallel to each other, and in which the said tube has a centrally and longitudinally disposed opening in the bottom cylindrical face thereof.

5. An apparatus as claimed in claim 4, in which the areas of the said slant openings are in sum equal to the area of the said opening in the bottom cylindrical face of the tube.

6. An apparatus as claimed in claim 1, in which the said transverse disposition of said duct is effected by suspension means bearing at its upper end a left handed external thread engaging a centrally situated left hand internally threaded bore in the said lid and in which in use the stirring means induces a clockwise vortex in the sense of the operator, whereby the duct will not be moved by the force of the said vortex thereon.

7. A separator apparatus for the separation at ambient or elevated temperatures and pressures of a mixture of solid substances by treatment with a solvent, in which mixture one or more of the components thereof is substantially insoluble under the selected operating conditions, the apparatus comprising:
  a pot having a bottom wall and generally cylindrical sidewall extending upwardly from the bottom wall, the top of the sidewall defining a mouth;
  A lid for closure and pneumatic sealing of said mouth when the apparatus is in use;
  a horizontally rotational magnetic or mechanical stirring means in the pot in contact with or in proximity to the bottom wall of the pot;
  heating means contacting the external surface of the sidewall of the pot; and
  temperature responsive means for controlling the heating means;

wherein the pot contains a separator assembly comprising an outer annular skirt of external diameter substantially equal to the internal diameter of the sidewall of the pot, one or more horizontal spokes extending inwardly from an upper end region of said skirt and coupled at their inward ends to a ring having an inner circumferential surface which defines a flange arranged to support a transverse apertured layer, said apertured layer being supported on the flange and coplanar with said spokes and being disposed above the said stirring means and being permeable to said solvent but impermeable to said solid mixture, the separator assembly further comprising an open cylinder supported at a bottom region thereof in said flanged ring so as to define a sidewall coaxial with said pot sidewall and extending upwardly from the apertured layer, the outer annular skirt resting directly on the bottom wall of the pot or indirectly via a supporting annulus and said spokes permitting the upward passage therethrough of a vortex of the solvent; wherein in use the stirring means induces a solvent vortex which runs up to above the top of the separator assembly; and wherein a tube means is suspended by support stem means transversely within the pot above the separator assembly and below the mouth of the pot so that the tube means will not be moved by the force of the vortex thereon, which tube means has a length such as to define a small clearance between the ends thereof and the internal sidewall of the pot and has defined at its ends inlets for the solvent vortex, an outlet being defined in the bottom of the tube means above the open cylinder for the solvent to pour down onto the mixture therein and the support stem means being borne centrally on the inner face of the lid.

8. An apparatus as claimed in claim 7, in which the ends of the said tube means are convexly profiled to match the concavity of the internal vertical wall of the said pot, and in which the small clearance is defined between the said convex end profiles and the said matching concavity of the pot wall.

9. An apparatus as claimed in claim 8, in which the inlets of the tube means are defined by diagonally opposite vertically planar slant openings which intersect the ends of the said tube means so that the vertical open end depth of each such opening is equal to the internal diameter of the tube means.

10. An apparatus as claimed in claim 9, in which the said slant openings are parallel to each other, and in which the said tube means has a centrally and longitudinally disposed opening in the bottom cylindrical face thereof.

11. An apparatus as claimed in claim 10, in which the areas of the said slant openings are in sum equal to the area of the said opening in the bottom cylindrical face of the tube means.

12. An apparatus as claimed in claim 7, in which the said support stem means bears in its upper end a left handed external thread engaging a centrally situated left hand internally threaded bore in the inner face of the said lid and in which in use the stirring means induces a clockwise vortex in the sense of the operator whereby the tube means will not be moved by the force of the said vortex thereon.

* * * * *

UNITED STATES PATENT AND TRADEMARK OFFICE
CERTIFICATE OF CORRECTION

PATENT NO. : 4,680,112

DATED : July 14, 1987

INVENTOR(S) : Alan Carrol

It is certified that error appears in the above-identified patent and that said Letters Patent is hereby corrected as shown below:

FIGURES 1 and 6 should appear as shown on the attached sheets

Signed and Sealed this

Nineteenth Day of July, 1988

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,680,112

DATED : July 14, 1987

INVENTOR(S) : Alan Carrol

It is certified that error appears in the above-identified patent and that said Letters Patent is hereby corrected as shown below:

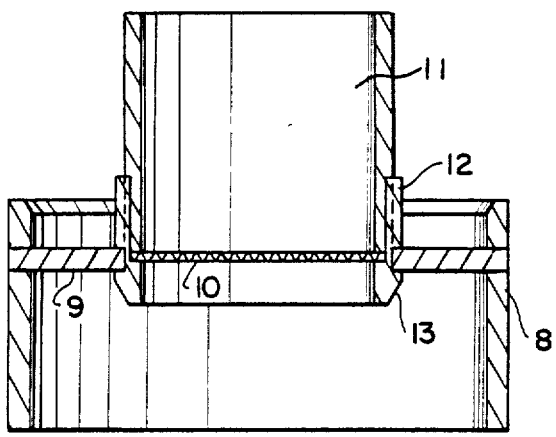

FIG. 6